United States Patent [19]

Bruno

[11] 4,038,780
[45] Aug. 2, 1977

[54] WATER CONTAINER DEVICE FOR PLANTS
[75] Inventor: Edward C. Bruno, Denver, Colo.
[73] Assignee: Polycraft Corporation, Denver, Colo.
[21] Appl. No.: 680,202
[22] Filed: Apr. 26, 1976
[51] Int. Cl.² .............................................. A01G 31/00
[52] U.S. Cl. ................................ 47/63; 24/129 D;
   47/48.5; 47/67; 47/DIG. 3; 248/22
[58] Field of Search ................ 47/1.2, 34, 34 T, 35,
   47/38, 38.1, 41, 48.5, 63, 67; D6/113; 229/8;
   206/45.34, DIG. 806; 24/81 CL, 81 FH, 81 H,
   255 BC, 255 F, 261 PT, 129 D, 136 L, 136 R,
   117 R; 428/7–8, 13, 28, 35, 23, 14, 22, 11

[56] References Cited
U.S. PATENT DOCUMENTS

| | | | |
|---|---|---|---|
| 689,248 | 12/1901 | Timm | 47/48.5 |
| 2,595,782 | 5/1952 | Epstein | 47/48.5 |
| 2,600,718 | 6/1952 | Wilson | 47/1.2 |
| 3,222,819 | 12/1965 | Marcan | 47/35 |
| 3,259,236 | 7/1966 | Cole | 47/34 T |
| 3,498,520 | 3/1970 | Zumpel et al. | 229/8 |
| D. 235,399 | 6/1975 | Malnekoff | D6/113 |

FOREIGN PATENT DOCUMENTS 4,231   1885   United Kingdom ...................... 47/41

Primary Examiner—Edgar S. Burr
Assistant Examiner—James R. Feyrer
Attorney, Agent, or Firm—Leo J. Aubel; Gerald T. Shekleton

[57] ABSTRACT

A device for automatically supplying water to house plants over a prolonged period of time including a body for the storage of water and an elongated neck with a small hole in its side attached to the body. When inverted the neck is stuck into the potting soil of a house plant so the body rests on the soil, water slowly seeps out into the soil. When in an upright position with holes made in the body portion, and the device is hung by appropriate means, it may also serve as a rooting device when plant cuttings are inserted into the water in the body through the formed holes.

1 Claim, 2 Drawing Figures

U.S. Patent    Aug. 2, 1977    4,038,780
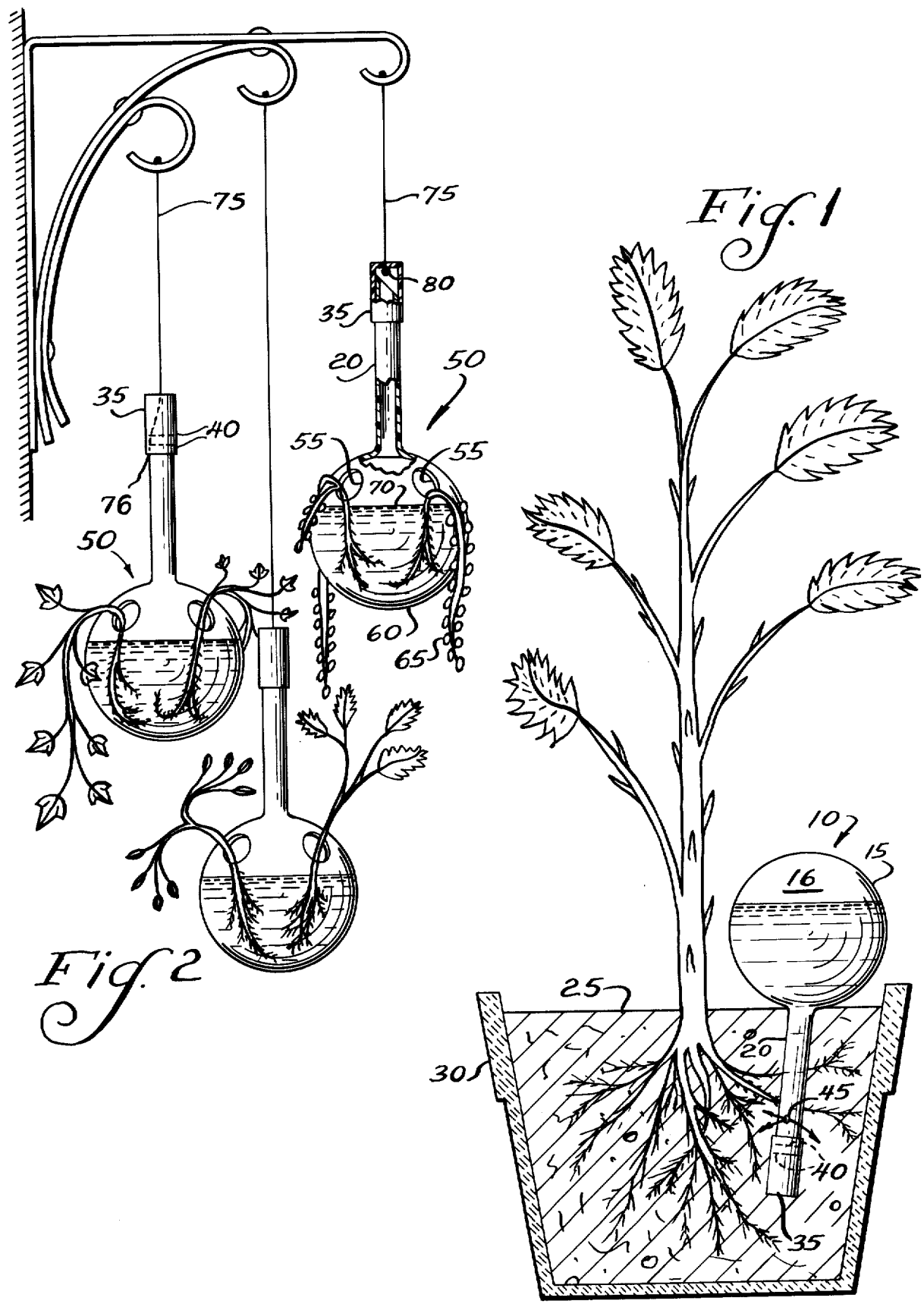

WATER CONTAINER DEVICE FOR PLANTS

BACKGROUND OF THE INVENTION

This invention relates to a means for providing water to house plants and, in particular, a water storage device which may be used for rooting cuttings of house plants or providing a steady flow of moisture to an established house plant, which is easily convertible into a root starting device for plant cuttings.

The care of house plants has long centered about the provision of an adequate supply of water to the roots of the plant. Such a vital requirement of a plant is often neglected through either forgetfulness or necessity, for instance, during a prolonged absence of the plant's owner and other similar circumstances. Conversely, excess water can also be a cause of the demise of a house plant.

In the initial rooting of a cutting taken from a healthy, established plant, a miscellany of containers are commonly used. There is, however, a need for a need for a container which has a narrow enough opening; that is, one that supports the cutting in any way, while also retaining the plant leaves above water to prevent rot. A clear container is normally desired so that the grower may easily determine the extent of the growth of the new root system for a determination of the proper time to transplant the new rooted cutting.

SUMMARY OF THE INVENTION

It is therefore an object of this invention to provide a means of watering house plants at a uniform rate over long periods of time.

Another object of this invention is a watering device which holds an adequate supply of water and releases the water in a constant trickle into the soil surrounding the roots of the house plant.

Still another object of this invention is a container for initially rooting a cutting from a healthy house plant.

Yet another object of this invention is a device for the initial rooting of cutting comprising the addition of small holes adjacent the neck portion of the watering device mentioned above.

Yet another object of this invention is such a watering and rooting device formed of clear material to enable the level of water to be determined in the watering bowl while the extent of the new root system may be ascertained when used as a rooting means, and to facilitate the addition of water when necessary.

These and other objects are attained in accordance with the present invention wherein there is provided in the preferred embodiment a container for water having a thin, narrow neck and a spherical body. The container is formed of a clear plastic and tightly capped at the end of the neck so as to engage and hold a string or thread thereto. Intermediate the end of the neck and the body of the container a small hole is formed. Thus, when the container is filled with water it may be inverted and the neck pushed into the soil, the body of the container resting on the soil surface. In this manner water is released through the small opening in the stem of the watering device in measured amounts, keeping the soil around the roots of the plant thoroughly moistened. Water continues to seep out of the opening in the neck of the container by capillary action until the water supply is depleted in the container. When this water supply is thus depleted it can be visually observed as a result of the clarity of the material forming the container and at that time may be replenished.

A plurality of holes may be formed on the top portion of the spherical body of the watering device, thereby forming a means for rooting the cuttings of healthy plants. These holes may be approximately 1 centimeter in diameter. The cuttings may be inserted into these openings thus formed for the subsequent growth of new roots. Because of the clear material of which the container is formed the developing root system is visible at all times from all directions, and thus its rate of growth may be instantly appraised. The cap and attached string provide a means for hanging the rooting device from an appropriate fixture thereby making it easily positionable near an appropriate source of light. The size of the holes formed in the container makes the cuttings easily insertable and yet provides a maximum amount of support for the cuttings so that the leafy portion of the cutting does not fall into or out of the container while maintaining the developing root system under water at all times. Further, the small size of the holes retards the evaporation of water so that the customary build up of salts occasioned by the constant addition of water to replace that lost by evaporation is avoided. Thus, a healthy environment in a sunlit area is assured for the cutting.

DESCRIPTION OF THE DRAWINGS

Further objects of the invention together with additional features contributing thereto and advantages accruing therefrom will be apparent from the following description of one embodiment of the invention when read in conjunction with the accompanying drawings, wherein:

FIG. 1 shows the inventive watering device in position and providing water to the soil; and, FIG. 2 shows a plurality of rooting devices suspended from an appropriate hanging device.

Referring now to FIG. 1, one embodiment of the watering device 10 is shown as comprising a spherical body 15. This spherical body 15 is preferably formed of a clear plastic such as polycarbonate or polyethylene. These plastics and others similar are well known to be breakage resistant and thus, are superiorly suited for such an application. The comparatively small size of the subject invention and the manipulation required of a user to enable the invention to perform its various functions, makes the use of such an "unbreakable" material extremely attractive. Were glass to be used, the slender neck would have to be constructed in a much thicker manner. Yet even this exigency would not guarantee that the neck would not break off with a glass structure at the point of joinder with the spherical portion itself. Thus, the use of a resilient, translucent plastic, such as those mentioned above, provides a safe and attractive commerical product. A neck or stem portion 20 is shown as inserted in the soil 25 of the plant bearing flower pot 30. The watering device 10 is inserted to the base of the neck 20 so that entire watering device 10 is now supported by the spherical body portion 15. In this manner the watering device 10 can be held securely and resists movement within the flower pot 30. This factor is important as will be shown below.

A cap 35 securely seals the end of the neck 20 furthest from the spherical portion 15. A secure fit and seal is insured by the presence of raised ribs 40 on the inside of the cap 35. These ribs perform the dual function of both allowing the cap to support the weight of the ball when filled with water and used for rooting purposes, as will be explained hereinafter, and also for sealing the ball 10 when inverted in the soil 25.

When in the position of being inverted and in the soil 25, as shown in FIG. 1, the ball provides an effective method to supply an adequate amount of moisture automatically to live and blooming plants. Water is released through the stem 20 of the watering ball and automatically moistens the soil 25 slowly and thoroughly. Water seeps out of the stem through a small opening 45 (roughly 1–3 millimeters) located near the cap 35 on the stem 20. By reason of the diminutive size of the hole 45 water seeps out of the ball 10 in a slow and controlled manner. The speed of this water flow is further diminished by the partial vacuum created by the escaping water. Periodically air from the soil 25 will enter the ball 10 through the same opening 45 to relieve this partial vacuum. Thus, it can be seen that the flow of water will periodically increase and decrease from the watering ball 10. Also should the plant be placed in direct sunlight, thereby evaporating much of the moisture in the soil 25, the air 16, within body portion 15 will be heated and caused to expand, forcing sufficient water out to replace that lost in the soil by evaporation.

It is important, when inserting the watering device 10 into the soil, to take care to push the watering ball 10 deep enough to seat the spherical body 15 on the soil 25. This precaution allows the weight of the watering ball 10 to be placed on the spherical portion, and, in addition, the position of the watering ball 10 is securely fixed. Were this not the case, a movement of the pot 30 while, for instance, positioning the plant, would produce a corresponding opposite movement in the watering ball. This movement could set up an oscillatory movement of the water contained within the watering ball 10 which would then be transmitted to the pot. If the watering ball is not securely seated within the soil 25, the ball 10 will create air pockets around the stem 20. These air pockets could negate the capillary action of the soil in allowing a slow release of the water, were an air pocket of sufficient size formed around the opening 45. The water could then dribble out at an increase rate and thereby supply an abnormally high rate or water to the plant. With most varieties of house plants, this inundation of moisture could be a source of damage or, perhaps even death to the plant.

FIG. 2 shows the subject invention which has been converted into a rooting ball 50. Large openings 55 of roughly 1 centimeter are formed in the upper portion of the spherical body 60 near the neck portion 20. Small cuttings, as at 65, may be inserted through these openings 55 into the water 70 contained within the spherical portion 60 of the rooting ball. Ideally the level of the water 70 is located just below the bottom lip of the openings 55. The cap 35 seals and retains the rooting ball 50 in the same manner as in the watering device 10. A string or thread 75 secured to the cap 35 serves to suspend the rooting ball 50 from a suitable hanging device. This string 75 can be retained within the inside of the cap 35 by suitable retention means 80, such as a knot or the like. In a preferred embodiment, as shown in FIG. 2, the string or line 75 is positioned through the top of the cap 35 and held between the ribs 40 of the cap and the neck or stem 20, thereby securing the line 75 to fully support and suspend the rooting ball 50 while leaving a trailing portion 76 of the line beneath the cap 35.

A rooting ball in use in filled roughly two-thirds to threefourths full of water through the openings 55 in the top portion of the rooting ball 50. Stem cuttings, such as at 65, are inserted into the water 70 through the openings 55. The leaves of the cuttings 65 should not be immersed in the water 70 since rot will occur. The user may add a pinch of sugar or other soluble plant food to assist in the root growth. It is preferable that the water be changed every month to supply fresh oxygen to the roots. However, it is not necessary to be concerned about the level of water within the rooting ball 50 over a period of time since, as already stated, evaporation of the water is kept to a minimum. This advantage obviates the chances of excessive salts being present in the water.

While the invention has been described with reference to a preferred embodiment, it will understood by those skilled in the art that various changes may be made and equivalents may be substituted for elements thereof without departing from the essential scope thereof of the invention. In addition, many modifications may be made to adapt a particular situation or material to the teachings of the invention without departing from the essential scope thereof. Therefore it is intended that the invention not be limited to the particular embodiment disclosed as the best mode comtemplated for carrying out this invention but that the invention will include all embodiments falling within the scope of the appended claims.

I Claim:

1. A house plant watering and rooting device having a water storage portion comprising a hollow spherical ball of translucent plastic material; an elongated hollow cylindrical neck portion having one end thereof integrally attached to an upper portion of said ball; a plastic cap having cylindrical walls, an upper end and an open lower end, said cap having ridges on its interior wall surface; the neck portion having a free end, said cap enveloping the free end of said neck portion and said ridges frictionally grasping a portion of said neck portion; a string extending through said upper cap end and positioned intermediate said cap and the exterior wall surfaces of said neck portion; said cap ridges and the outer surface of said neck portion thereby securing said string for supporting and suspending said plant watering device; and a plurality of openings on said upper portion of the ball for permitting the stem portion of plants to be easily inserted therein.

* * * * *